UNITED STATES PATENT OFFICE 2,121,472

OXIDATION PRODUCTS OF OCTYL CYCLOHEXANOL

Joseph B. Niederl and Richard A. Smith, New York, N. Y., assignors to Röhm & Haas Company, Philadelphia, Pa.

No Drawing. Application November 11, 1937, Serial No. 174,020

2 Claims. (Cl. 260—131)

This invention relates to the preparation of products derived from hydrogenation products of octyl phenols and their derivatives.

An octyl phenol is first hydrogenated as, for instance, by the procedure disclosed in Patent 2,026,668 issued January 7, 1936, so that three molecules of hydrogen enter the aromatic nucleus. The resulting product, an octyl cyclohexanol shows useful properties and can suitably be employed both as a solvent and a camphor substitute in pyroxylin plastics. Its esters can be used for the same purposes as well as for the preparation of synthetic resins and related materials.

By dehydration of the octyl cyclohexanol the octyl cyclohexene is obtained, a compound that can be usefully employed for various condensations, especially with phenols to yield octyl cyclohexyl phenols of useful properties.

Furthermore, the hydroxyl group can be replaced by a primary, secondary or tertiary amino group, yielding the corresponding octyl cyclohexyl amines of interesting physical and chemical properties.

The octyl cyclohexanol can be oxidized in a number of ways. Mild and controlled oxidation yields an octyl cyclohexanone, which again shows useful properties and also can be suitably employed both as a solvent and a camphor substitute in pyroxylin plastics. Due to the presence of a ketonic carbonyl group in the octyl cyclohexanone, this compound exhibits typical cyclo ketone reactions and is therefore capable of undergoing a number of condensation reactions, for instance with phenols.

By further oxidation of either the octyl cyclohexanol, the octyl cyclohexanone, or the octyl cyclohexene, an octyl adipic acid is obtainable. This acid is useful in the manufacture of synthetic "alkyd" resins by condensation with polyhydric alcohols and the acid itself or its esters can also serve as a plasticizer in various ways.

The following examples show in detail the manner of carrying out the preparation of an octyl cyclohexene, an octyl cyclohexyl amine, an octyl cyclohexanone and an octyl adipic acid.

*Example 1—β-tertiary octyl cyclohexene.*—One mol. of γ-tertiary octyl cyclohexanol is treated with one-twentieth of a mol. of concentrated sulfuric acid in a distillation apparatus. The mixture is gradually brought to boiling. The entire reaction may more conveniently be carried out at diminished pressure. The crude β-tertiary octyl cyclohexene is then further purified by fractional distillation preferably under diminished pressure. B. P. 113° C. at 12 mm. $n_D^{22°}$: 1.4741; sp. g.: 0.8565 at 25°.

*Example 2—γ-tertiary octyl cyclohexyl amine.*—A solution of 2.5 g. of tertiary octyl cyclohexanonoxime in 100 cc. of absolute alcohol was brought to boiling and 3 g. of sodium was added in small pieces. After the reaction was complete, the whole was neutralized with hydrochloric acid, cooled, and filtered from the precipitated sodium chloride. The precipitate was washed with 20 cc. of hydrochloric acid and the combined liquids evaporated to dryness on a steam bath. The residue was stirred with an excess of 10% sodium hydroxide, twice extracted with ether, the combined ether layers treated with an excess of hydrochloric acid, and the whole again evaporated to dryness on a steam bath. The product was purified by recrystallization from acetone. It is insoluble in ether, moderately soluble in hot alcohol, and acetone, and sparingly soluble in cold acetone. M. P. 260–265° with decomposition.

The same product can be obtained by treating the γ-tertiary octyl cyclohexanol with ammonia under pressure in the presence of zinc chloride, or by the interaction of γ-tertiary octyl cyclohexyl chloride, prepared from the above cyclohexanol and a phosphorus or sulfur chloride with ammonia.

*Example 3—γ-tertiary octyl cyclohexanone.*—A solution containing 30 g. potassium dichromate and 25 g. of concentrated sulfuric acid in 150 cc. of water was placed in a flask equipped with a thermometer and stirrer. 28 g. of p-tertiary octyl cyclohexanol was added over a period of half an hour. The temperature was maintained at 50–55° C. When the reaction was completed the solution was cooled and the product, p-tertiary octyl cyclohexanone, was purified by fractional distillation. It boiled at 142–144° C. at 11 mm. pressure and had a specific gravity of 0.9850 and refractive index 1.4768. The yield was 85%.

Its oxime was prepared by using a 10% excess of hydroxylamine sulfate dissolved in the minimum quantity of water mixed with a molar quantity of tertiary octyl cyclohexanone in alcohol. The mixture was then treated with a 10% excess of 20% NaOH solution, and the whole heated on a steam bath for half an hour. The mixture was diluted to four times its volume with water, cooled, and the white crystalline oxime filtered off. M. P. 152° C.

*Example 4—β-tertiary octyl adipic acid.*—(a) 125 cc. of 50% nitric acid was placed in a flask equipped with a stirrer and a thermometer. A small amount approximately 0.2 g. of sodium vanadate was added and the acid heated to 110° C. A few grams of a tertiary octyl cyclohexanol, prepared by the catalytic hydrogenation of p-tertiary octyl phenol was added which caused the evolution of nitric oxide. The contents of the flask was then cooled to 60° C. and the tertiary octyl cyclohexanol was added at such a rate that the temperature was maintained between 55 and 65° C. Forty-two grams was added in this manner keeping the liquid well stirred during the addition of the substituted cyclohexanol and for one hour thereafter.

On cooling in an ice bath a mass of white crystals separated which was filtered off and dried. These crystals were purified by recrystallization from concentrated nitric acid. The resulting product had a melting point of 133–134° C. The yield was about 65% of the theoretical.

(b) The cyclohexanone prepared according to Example 4(a) was heated on a steam bath for several hours with eighteen times its weight of 50% nitric acid to which a trace of sodium vanadate had been added. On cooling crystals of β-tertiary octyl adipic acid formed. On recrystallization from concentrated nitric acid, the product melted at 133–134° C. The yield was 85%.

*Example 5—Tertiary octyl cyclohexyl phenol.—*
Molar quantities of phenol and tertiary octyl cyclohexene were heated on a steam bath to 60° and half of a mol. of concentrated sulfuric acid added with stirring. Stirring was continued for 8 hours, the temperature being constant. The colored viscous reaction mixture was twice water washed and fractionally distilled, in vacuo. The fraction boiling from 110° to 120° at 2 mm. is the product. It is crystalline and was recrystallized from petroleum ether. M. P. 81° C. B. P. 110–120° C. at 2 mm.

In the foregoing examples the reaction processes may be varied as to the quantities of the reactants, as well as temperature and duration without departing from the original scope of the invention.

In the foregoing examples and description and in the claims the term "tertiary octyl" is intended to mean the tetramethyl butyl radical having the formula:

$$(CH_3)_3C.CH_2.C(CH_3)_2—$$

This application is a continuation-in-part of copending application Serial No. 758,273 filed December 19, 1934.

What we claim is:
1. Octyl cyclohexanone—

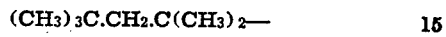

2. γ-tertiary octyl cyclohexanone—

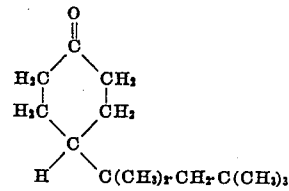

JOSEPH B. NIEDERL.
RICHARD A. SMITH.